United States Patent [19]

Ashby

[11] 4,045,545
[45] Aug. 30, 1977

[54] MANUFACTURE OF COMPLEX HYDRIDES

[75] Inventor: Eugene C. Ashby, Atlanta, Ga.

[73] Assignee: Ethyl Corporation, Richmond, Va.

[21] Appl. No.: 545,114

[22] Filed: Jan. 29, 1975

Related U.S. Application Data

[63] Continuation of Ser. No. 221,075, Jan. 26, 1972, abandoned, which is a continuation-in-part of Ser. No. 751,862, July 30, 1958, abandoned.

[51] Int. Cl.² .............................................. C01B 6/24
[52] U.S. Cl. .................................................. 423/644
[58] Field of Search ....................................... 423/644

[56]       References Cited
U.S. PATENT DOCUMENTS 2,992,248   7/1961   Pearson ............................. 423/644

3,556,740   1/1971   Murif ................................. 423/644

FOREIGN PATENT DOCUMENTS 1,080,019   8/1967   United Kingdom ................ 423/644

OTHER PUBLICATIONS

Fakharkin et al., "Academy of Sciences, USSR, Proceedings," Chem. Sec., vol. 145, 1962, pp. 656–658.

Primary Examiner—Herbert T. Carter
Attorney, Agent, or Firm—Donald L. Johnson; John F. Sieberth; David L. Ray

[57]            ABSTRACT

A process for the preparation of alkali metal aluminum hydrides including reacting aluminum and an alkali metal or alkali metal hydride with hydrogen at elevated temperatures and under super atmospheric pressure in the presence of an aliphatic or aromatic hydrocarbon.

8 Claims, No Drawings

MANUFACTURE OF COMPLEX HYDRIDES

CROSS-REFERENCE TO RELATED APPLICATION

This application is a continuation of Ser. No. 221,075, filed Jan. 26, 1972 which in turn is a continuation-in-part of Ser. No. 751,862, filed July 30, 1958, both now abandoned.

FIELD OF THE INVENTION

This invention relates to the manufacture of complex hydride products. More specifically, the invention relates to an improved process for producing bimetal complex hydrides, of an alkali metal or an alkaline earth metal, with a Group III-A metal having an atomic number of more than 5. Typical complex hydrides of this type are lithium aluminum hydride, $LiAlH_4$; sodium aluminum hydride, $NaAlH_4$; calcium aluminum hydride, $Ca(AlH_4)_2$, and the like. The invention provides solid hydride products, and in other cases, the finished reaction product is a heterogeneous or liquid-solid system in which substantially all of the complex hydride is present as precipitated solids.

BACKGROUND OF THE INVENTION

Complex hydrides of the Group III-A metals are well known as having particularly effective properties as strong reducing agents and for starting materials in the preparation of other organic metallic compounds. For example, British Pat. No. 757,524 describes the treatment of bimetal hydrides with an olefin to produce an alkyl bimetal compound, such as tetrapropyl lithium aluminum. Heretofore, however, these materials were necessarily made by rather complex and roundabout methods which, further, were wasteful of basic raw materials. Thus, Schlesinger and Finholt, in U.S. Pat. No. 2,567,972 describe the preparation of materials such as lithium aluminum hydride, $LiAlH_4$, by the reaction of an aluminum halide with either an alkali metal or an alkaline earth metal hydride in the presence of an aliphatic other. A typical equation illustrative of this process is:

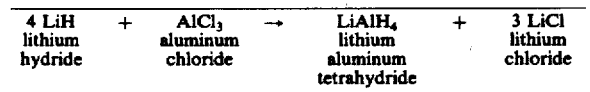

It is seen, readily, that in the above type of reaction the aluminum providing material is necessarily a halogen compound, and secondly, the halogen content thereof is not utilized. Further, the lithium hydride employed is very inefficiently utilized, viz., even at full effectiveness of the quoted reaction only one-fourth of the lithium appears in the desired product. Thus, the Schlesigner et al process is inherently very inefficient with respect to the alkali metal employed.

U.S. Pat. No. 3,556,740, issued Jan. 19, 1971 to Murib discloses a method for preparation of complex metal hydrides of the formula $RXH_4$ wherein R is an alkali metal and X is a metal from the group consisting of aluminum, gallium, indium, and thallium which comprises hydrogenating a metal from the aforesaid group in the presence of an alkali metal hydride and an ether solvent for the complex metal hydride such as tetrahydrofuran (THF) or dimethyl ether of diethylene glycol (DMC).

The preparation of complex metal hydrides ($MAlH_4$) in ether solvents has many disadvantages. The commercial grade ethers must be purified to completely remove water, alcohols and explosive peroxides and hydroperoxides before use. Longterm storage of ether results in deterioration of the complex metal hydrides due to ether cleavage and formation of unwanted alkoxy products. It is costly and fairly difficult to isolate solvent-free complex metal hydrides from ether solutions of these materials. Ether-type solvents such as tetrahydrofuran and dimethyl ether of diethylene glycol are high cost materials and are potentially dangerous in this type reaction if subjected to excessively high reaction temperatures. A violent explosion occurred in 1953 at Callery Chemical Company, Callery, Pennsylvania when lithium aluminum hydride was being used to dry diethylene glycol dimethyl ether. The explosion was reported in *Chemical and Engineering News*, Vol. 31, p. 2334 (1953).

An object of the present invention is, then, to provide a new and more efficient process of producing the complex hydride compounds of certain Group III-A metals with electropositive metals of the alkali and alkaline earth types. A more particular object is to provide such a process which achieves a substantially improved utilization of raw materials. A further object is to provide a process for making such complex bimetal hydrides directly from low priced raw materials. An additional object of certain forms of the process of the invention is to provide a direct route and an accelerated or catalyzed technique for effecting the process. Other objects will appear thereafter.

THE INVENTION

Briefly, the process of the invention comprises the pressure hydrogenation of a liquid-solid reaction system, said system including a metal of Group III-A of the periodic system having an atomic number greater than 5, an electropositive metal component selected from the group consisting of alkali metals, alkaline earth metals, alkali metal hydrides, and alkaline earth metal hydrides, and lastly a liquid reaction medium. The products obtainable include compounds of the type $M(M'H_4)_n$, where M is an alkali or an akaline earth metal, M' is a metal of Group III-A of the periodic arrangement of elements having an atomic number above 5, and $n$ is the valence of the metal M. Typical product compositions thus include sodium aluminum hydride, lithium aluminum hydride, magnesium aluminum hydrides such as $Mg(AlH_4)_2$, $HMgAlH_4$; calcium aluminum hydrides, e.g., $Ca(AlH_4)_2$; potassium aluminum hydride, $KAlH_4$; barium indium hydride, $Ba(InH_4)_2$, and others. In the present process a product is withdrawn which is heterogeneous in that it includes a solid phase of the desired bimetal hydride plus very minor components of the hydride retained in the liquid medium.

The liquid reaction media, as described more fully hereinafter, are discovered to be vital to the full effectiveness of the process of the invention. In all instances the liquid medium should be an organic liquid which is stable at reaction conditions and which is a non-solvent for the desired bimetal hydride product. Such non-solvent media yield a solid, readily filterable product. Illustrative of such liquids are the aromatics, e.g., toluene, and aliphatics, e.g., 2,2,5-trimethylhexane, or n-decane. Aromatic hydrocarbons are particularly desirable because of their ready availability, purity and moderate cost, as well as greater solubility for the catalyst system.

In a liquid hydrocarbon reaction medium, the alkali metal hydride (MH), aluminum hydride ($AlH_3$) and the product complex metal hydrides ($MAlH_4$) are all insoluble. Only the small quantity of catalyst used is soluble in the liquid hydrocarbon reaction medium. Therefore, it was unexpected that the complex metal hydrides could be prepared in reaction media consisting of aliphatic or aromatic hydrocarbons. In fact, when no catalyst is added to the reactants in the hydrocarbon reaction medium complex metal hydrides are formed at best in low yields. Inasmuch as aliphatic or aromatic hydrocarbons are used as the reaction medium, complex metal hydrides are produced in solid, crystalline form of up to about 90–95 percent purity.

An advantage of using aromatic or aliphatic hydrocarbons as reaction medium in accordance with this invention is the fact that they can be recovered and recycled directly in the reaction. In addition, the catalysts referred to hereinafater and which are preferably used in the reaction remain in solution in the hydrocarbon reaction medium and can be recycled therewith. In fact, the solution of catalyst and hydrocarbon reaction medium can be recycled several times before additional catalyst is required. The solid, crystalline complex metal hydride is stable indefinitely at room temperature, whereas the complex metal hydride dissolved in an ether will deteriorate with age due to cleavage of the ether by the complex metal hydride. Complex metal hydrides in crystalline form are much more versatile than complex metal hydrides dissolved in ethers since crystalline sodium aluminum hydride can be used in any solvent or liquid desired.

It is preferred that stoichiometric proportions of the Group III-A metal, such as aluminum, gallium, or indium, and the Group I-A and II-A alkali or alkaline earth metal be maintained in the reaction. The precise physical form of the aluminum, or other Group III-A metal, is not highly critical. Generally, a fair degree of comminution or subdivision is desirable to provide ample reacting surface without the necessity of extreme mass excesses at any particular time. A typical grade of commercial aluminum metal is a powder in which 99.5 percent of the aluminum metal will pass a 74 micron screen and 65 percent is smaller than 44 microns in maximum dimension.

Although 140° to 145° C is a perfectly satisfactory temperature level for operation, it is further found that higher temperatures are particularly beneficial in further increasing the rate of reaction. In general, then, the process of the invention is operable over a wide range of temperature and pressure conditions. Generally, a suitable temperature range is from about 50° C up to, usually, about 230°–250° C, but because of the adverse effect of low temperature, a preferred range is 140° to 200° C.

An important and preferred route or embodiment of the present invention involves the direct formation of the complex hydrides without preceding preparation of an alkali or alkaline earth metal hydride, but employing solely the metal charge. By this is meant that the strongly electropositive metal forming one of the constituents of the desired product composition is initially fed as the metal itself.

Pressures as low as several atmospheres can be satisfactorily employed, the function of the pressure apparently being to dissolve the hydrogen in the liquid phase present. When relatively low pressures are used it is generally very beneficial to modify the operating technique to provide for feeding additional hydrogen during the course of reaction to compensate for the hydrogen consumed.

As previously mentioned, an essential feature of the present process is the presence of a stable liquid reaction medium during the treatment with hydrogen. Stable aromatic and saturated aliphatic hydrocarbons are used. The liquid is employed in sufficient quantity to provide a high degree of mobility of the heterogeneous reaction system. Thus, a suitable range is from 2 to about 25 parts by weight to one part of alkali metal hydride, when the alkali metal hydride is sodium hydride. A more generalized expression of preferred reaction medium proportions is on the basis of from about 200 to 500 milliliters of liquid charged per gram mole, or gram atom of the electropositive metal component charged. The proportions mentioned are not limiting. Quantities outside of this range can be used when process requirements make such adjustment desirable. In virtually all instances it is desirable to provide liquid medium in the proportions of at least 100 parts to each gram atom, or gram mole, of the electropositive metal component fed to the reaction.

The Group III-A metal employed must be capable of reaction under the recited conditions. Ordinary commercial comminuted aluminum is suitable for the process. A charge of aluminum will proceed to react with only a very minor or no induction period in the cases where minor quantities of soluble metal alkyls have been added to the reacting system. The metal alkyls are highly beneficial to promote the rate of hydrogen take-up. In most instances such catalysis is preferably afforded by compounds of the metal forming a portion of the bimetal hydride to be produced, and more particularly, the Group III-A metal therein. Thus, when aluminum alkyl materials such as triethyl aluminum, diethyl aluminum hydride, triisopropyl aluminum, triisobutyl aluminum and the like, and materials such as triethyl boron, trihexyl boron, and the like are added, benefits are realized. If desired, the catalyst can be a hydrocarbon compound of the Group I-A or Group II-A metal. Thus ethyl lithium, butyl sodium and similar agents are effective catalysts. The catalysts can be prepared in situ by reaction of the alkali or alkaline earth metal or metal hydride with an alkyl halide compound. In most instances the proportions of catalysts used are quite low, of the order of a fraction to several percent, and seldom above 5 percent, based upon the liquid media present.

It was found that the process is susceptible to ramifications or embodiments of a considerable variety. The details of the invention and of the best mode of its operation will appear in the following examples.

EXAMPLE I 0.5 Moles of sodium and 0.526 moles of finely comminuted, substantially oxide-free aluminum metal were added to a reaction vessel containing 100 milliliters of toluene and 2 milliliters of triethyl aluminum. The aluminum was substantially completely in the form of particles smaller than 74 microns in size. The reactor was closed and at 160° C and a hydrogen pressure of 5000 psi the reaction proceeded smoothly, and substantially complete reaction occurred in 4.75 hours. During the course of the reaction the contents of the reactor were continuously agitated by means of a vertically reciprocating agitator. At the conclusion of the foregoing treatment, the reactor and contents were allowed to cool to ambient temperature and the excess hydrogen in the reaction zone was vented. The product appeared as a readily filterable, solid product in the toluene reaction medium. The contents were then filtered through an inert, fritted filter septum whereby a solid product was isolated and recovered and contained a typically high (90+%) amount of sodium aluminum hydride.

EXAMPLE II

The procedure of Example I was repeated, except at 2000 psig hydrogen pressure, to provide the following data illustrating the effectiveness of various metal alkyl and aryl compounds as catalysts for the preparation of complex metal hydrides:

| Run No. | Reaction Medium | Reaction Time, hr | Catalyst Compound | Amount | $NaAlH_4$ in Product, Wt % |
|---|---|---|---|---|---|
| 1 | Toluene | 14 | $Al(C_2H_5)_3$ | 2 ml | 93.0 |
| 2 | TMH* | 16.0 | $Al(C_2H_5)_3$ | 2 ml | 92.5 |
| 3 | Toluene | 15.5 | $B(C_2H_5)_3$ | 2 ml | 67.5 |
| 4 | Toluene | 20.0 | $Al(CH_3)_3$ | 2 ml | 69.6 |
| 5 | TMH | 16.0 | $B(C_6H_{13})_3$ | 3 ml | 40.6 |
| 6 | TMH | 16.0 | $Al(C_6H_5)_3$ | 2.2 g | 40.4 |

*2,2,5-trimethylhexane

Triethyl aluminum was the most effective material in catalyzing the reaction to prepare complex metal hydrides.

EXAMPLE III

The procedure of Example I was repeated, except for catalyst concentration and hydrogen pressure, to illustrate that the metal alkyl catalyst is important and that catalyst concentration has an effect on reaction time.

| Run No. | $H_2$ Press., psig | TEA$^c$, ml | Reaction Time, hr | Dry Solid Recovered Product, g | $NaAlH_4$ in Product, Wt % |
|---|---|---|---|---|---|
| 1 | 2000 | 8 | 10 | 30.8$^a$ | 97.3 |
| 2 | 2000 | 4 | 14 | 24.5$^b$ | 93.3 |
| 3 | 2000 | 2 | 16 | 27.1 | 92.1 |
| 4 | 5000 | 0 | 4.75 | 25.0 | 0.8 |
| 5 | 5000 | 2 | 4.75 | 27.4 | 93.7 |

$^a$The large amount of product recovered in this run was due to part of the NaAlEt$_4$H, crystallizing out.
$^b$Some of the product was spilled and lost. The usual amount of recovered product from a good reaction with this size charge is 27.0 to 27.5 g.
$^c$TEA = triethyl aluminum These results show that TEA catalyst is important and that increasing the catalyst concentration reduces the reaction time to produce the same high quality product. With 8 ml of TEA, the concentration of the catalyst complex was greater than the solubility in toluene at 25° C and part of it crystallized out of solution. This crystallization caused the product solids to cake in the reactor. Free-flowing, powdery products were obtained in the reactions with 2 and 4 ml of TEA catalyst, and therefore the solubility of the catalyst complex in toluene at 25° C appears to be somewhere in between the amounts formed from 4 and 8 ml of TEA.

EXAMPLE IV

The procedure of Example I was repeated, except for the experiments at 2000 psig, to illustrate the effect of hydrogen pressure on reaction time.

| Run No. | $H_2$ Pressure psig | Reaction Time, hr | $NaAlH_4$ In Product, Wt % |
|---|---|---|---|
| 1 | 2000 | 14 | 93.0 |
| 2 | 2000 | 16 | 86.8 |
| 3 | 2000 | 16 | 92.1 |
| 4 | 5000 | 7.3 | 94.0 |
| 5 | 5000 | 5.0 | 94.3 |

-continued

| Run No. | $H_2$ Pressure psig | Reaction Time, hr | $NaAlH_4$ In Product, Wt % |
|---|---|---|---|
| 6 | 5000 | 4.75 | 93.7 |

The above data show that slightly higher product purity is obtained in about one-third the reaction time at 5000 psig.

EXAMPLE V

The procedure of Example I was used, except that the pressure was 2000 psig, to illustrate the effect of temperature on product quality, both as to yield and physical appearance.

| Run No. | Reaction Medium | TEA Catalyst ml | Reaction Time, hr | Reaction Temp ° C | $NaAlH_4$ in Product, Wt % |
|---|---|---|---|---|---|
| 1 | TMH | 2 | 12.5 | 170 | 46.4 |
| 2 | TMH | 2 | 16.0 | 170 | 68.5 |
| 3 | TMH | 2 | 16.0 | 160 | 90.2 |
| 4 | TMH | 2 | 16.0 | 160 | 92.2 |
| 5 | Toluene | 2 | 16.0 | 160 | 92.1 |
| 6 | Toluene | 3 | 17.0 | 140 | 96.0 |

The product from the runs at 170° C were mostly hard, agglomerated lumps with shiny particles in them. Also, a considerable amount of similar product was caked in the bottom of the reactor and on the agitator. These products were low in sodium aluminum hydride content. In contrast, the experiments at 160° C or below produced free-flowing, fine granular material with no caking or lumping and with a typically high sodium aluminum content.

EXAMPLE VI

About one mole of sodium hydride and about 2.6 atom weights of finely comminuted, substantially oxide-free aluminum metal containing catalytic amounts of triethyl aluminum and diethyl aluminum hydride, were added to a reaction vessel containing 440 milliliters of toluene. The aluminum was substantially completely in the form of particles smaller than 74 microns in size. The reactor was closed and after an induction period of 0.6 hours at 145° C and a hydrogen pressure of 5000 psi hydrogen reaction proceeded smoothly and substantially complete reaction occurred in 3.3 hours. During the course of the reaction the contents of the reactor were continuously agitated by means of a vertically reciprocating agitator. At the conclusion of the foregoing treatment, the reactor and contents were allowed to cool to ambient temperature and the excess hydrogen in the reaction zone was vented. The product appeared as a readily filterable, solid product in the toluene reaction medium. The contents were then filtered through an inert, fritted filter septum whereby $NaAlH_4$ was isolated and recovered.

EXAMPLE VII

The procedure of Example VI is repeated, except that the charge includes 1 atom weight of calcium metal and about 5 atom weights of aluminum containing catalytic amounts of triethyl aluminum and diethyl aluminum hydride. The reaction proceeds satisfactorily and a good conversion to calcium aluminum hydride, Ca-$(AlH_4)_2$, based on the calcium charged, is provided.

Similarly, when magnesium, calcium hydride, magnesium hydride, or barium, for example, are substituted for the metal or the metal hydride used as the electropositive metal component in the preceding examples, good results are provided. Likewise, the aluminum metal employed can be replaced with equivalent amounts of gallium or indium, and the corresponding bimetal complex hydrides are readily generated. A particularly suitable form of calcium metal is the reactive form of calcium disclosed in U.S. Pat. No. 2,561,862.

As previously mentioned, the process is readily carried out in saturated aliphatic hydrocarbon liquids, as shown by the following example.

EXAMPLE VIII

The charge in this operation was 1 mole of sodium hydride, 2.6 atom weights of aluminum containing catalytic amounts of triethyl aluminum and diethyl aluminum hydride, and about 440 milliliters of 2,2,5-trimethyl hexane per gram mole of sodium hydride. After a short induction period at 145° C and a hydrogen pressure of 5000 pounds, hydrogen take-up occurred rapidly and smoothly. Substantially complete conversion, on the basis of sodium hydride present, occurred in about 2 hours. The product was a readily filterable, solid, flocculent precipitate of sodium aluminum hydride in the trimethyl hexane.

The complex hydrides produced according to the present invention find ready and highly effective usage as selective and powerful reducing agents for various organic and inorganic compounds. Among the compounds which can be so processed are silicon tetrachloride, to form silane; heptaldehyde, to manufacture n-heptyl alcohol; benzonitrile, to make benzylamine, and many others.

What is claimed is:

1. The process for the manufacture of alkali metal aluminum tetrahydrides in solid, readily filterable form comprising pressure hydrogenating at a temperature of about 50° C to 250° C, a mixture consisting essentially of aluminum, the hydride of an alkali metal, and an organic liquid reaction medium stable at reaction conditions, said medium being selected from the class consisting of aliphatic hydrocarbons and aromatic hydrocarbons, said pressure hydrogenating being carried out in the presence of a catalyst selected from the group consisting of alkyl compounds of metals of Group I-A, II-A and III-A of the periodic table, said catalyst being in proportions of up to about 5 weight percent of the reaction medium thereby forming an alkali metal aluminum tetrahydride consisting of aluminum, the alkali metal and hydrogen in solid form and recovering said solid.

2. The process of claim 1 further defined in that the liquid reaction medium is toluene.

3. The process of claim 1 further defined in that the liquid reaction medium is 2,2,5-trimethyl hexane.

4. The process of claim 1 wherein said alkali metal is sodium.

5. A process for the manufacture of alkali metal aluminum tetrahydrides in solid, readily filterable form comprising hydrogenating at a super atmospheric pressure of up to about 5000 pounds per square inch, and at an elevated temperature of up to about 250° C, a reaction system as defined hereafter, said reaction system consisting essentially of aluminum and an alkali metal hydride, and an organic liquid reaction medium stable at reaction conditions, said medium being selected from the class consisting of aliphatic and aromatic hydrocarbons, the hydrogenating being carried out in the presence of a catalyst consisting of an alkyl aluminum compound in proportions of up to about 5 percent based upon the liquid reaction medium thereby forming said tetrahydride in solid form and recovering said solid.

6. The process of claim 5 further defined in that the liquid reaction medium is toluene.

7. The process of claim 5 further defined in that the liquid reaction medium is 2,2,5-trimethyl hexane.

8. The process of claim 5 wherein said alkali metal is sodium.

* * * * *